United States Patent [19]
Hajmrle et al.

[11] Patent Number: 5,601,933
[45] Date of Patent: Feb. 11, 1997

[54] LOW FRICTION COBALT BASED COATINGS FOR TITANIUM ALLOYS

[75] Inventors: Karel Hajmrle; Anthony P. Chilkowich, both of Fort Saskatchewan, Canada

[73] Assignee: Sherritt Inc., Fort Saskatchewan, Canada

[21] Appl. No.: 504,638

[22] Filed: Jul. 20, 1995

Related U.S. Application Data

[63] Continuation-in-part of Ser. No. 214,263, Mar. 17, 1994, abandoned.

[51] Int. Cl.$^6$ .................................................. B32B 15/00
[52] U.S. Cl. .................... 428/660; 428/668; 416/219 R; 416/241 R
[58] Field of Search ................... 428/660, 614, 428/668; 416/219 R, 220 R, 241 R, 248; 277/236, 235 A

[56] References Cited

U.S. PATENT DOCUMENTS

| | | | |
|---|---|---|---|
| 2,928,757 | 3/1960 | Lee et al. | 428/660 |
| 3,143,383 | 8/1964 | Bamberger et al. | 428/678 |
| 4,124,737 | 11/1978 | Wolfla et al. | 428/679 |
| 4,598,016 | 7/1986 | Thoma et al. | 428/328 |
| 4,671,021 | 6/1987 | Takahashi et al. | 51/204 |
| 4,705,302 | 11/1987 | Beiley | 285/47 |
| 4,822,689 | 4/1989 | Fukubayashi et al. | 428/472 |
| 5,077,140 | 12/1991 | Luthra et al. | 428/660 |
| 5,137,422 | 8/1992 | Price et al. | 416/241 R |
| 5,226,977 | 7/1993 | Kitaguchi et al. | 428/660 |
| 5,292,596 | 3/1994 | Privett et al. | 428/660 |
| 5,363,554 | 11/1994 | Partridge et al. | 29/889.71 |

FOREIGN PATENT DOCUMENTS

| | | | |
|---|---|---|---|
| 4229600 | 11/1993 | Germany | C23C 30/00 |
| 7514964 | 8/1976 | Japan | C22C 14/00 |
| 2188942 | 10/1987 | United Kingdom | C25D 5/50 |
| 2243161 | 10/1991 | United Kingdom | C23C 4/06 |

OTHER PUBLICATIONS

J. D. Schell et al., Wear of Jet Engine Components, General Electric Aircraft Engines in ASM Handbook, vol. 18, Oct. 1992, pp. 588–592.

*Primary Examiner*—John Zimmerman
*Attorney, Agent, or Firm*—Arne I. Fors; D. Doak Horne

[57] ABSTRACT

A cobalt based coating is provided which is functional to reduce the coefficient of friction between two operatively, frictionally engaging titanium alloy surfaces.

30 Claims, 1 Drawing Sheet

LOW FRICTION COBALT BASED COATINGS FOR TITANIUM ALLOYS

This Application is a continuation-in-part of Application Ser. No. 08/214,263 filed Mar. 17, 1994 now abandoned.

FIELD OF THE INVENTION

The present invention relates to protective coatings adapted for titanium based alloy parts which come into frictional engagement with one another resulting in metal-to-metal wear. More specifically, the coatings find particular application in the protection from adhesive and fretting wear and galling and seizure of gas turbine and jet engine parts or the like made from titanium and titanium alloys.

BACKGROUND OF THE INVENTION

In certain applications, titanium based alloys are utilized under conditions wherein there is frictional metal-to-metal contact between two titanium alloy surfaces. An exemplary use would be that between the frictional parts of the roots of the compressor blades against the discs of a Jet engine. The blades are secured to their respective discs by means of a dovetail arrangement in which the dovetail base of a blade fits into a groove formed on the periphery of a rotating disc. During operation of the engine, centrifugal forces and vibration cause the blade to move in the groove. The fit of the dovetail base portion of the blade in the disc groove is designed to allow for this movement.

Local aerodynamic effects, resulting from the vane or strut positions relative to the rotating components in the compressor, will produce high frequency, low amplitude vibrations. The combination of high contact stress due to the centrifugal forces and high frequency vibration causes extensive surface damage to unprotected surfaces. Stated otherwise, maintenance of direct metal to metal contact between two titanium alloy surfaces leads to a high coefficient of friction with serious damage to both surfaces due to metal-to-metal wear of the metal alloy.

Generally, it is the fan and the front stage compressor blades operating under relatively low temperatures and which are manufactured from light-weight titanium based alloys which Oh are prone to metal-to-metal wear, whereas the rear stage compressor components operating under relatively higher temperatures are formed from materials such as steel or nickel based alloys which are less prone to metal-to-metal wear.

The current commercial practice involves protecting the titanium alloy components of gas turbine and Jet engines by the application of a thermal spray coating, preferably in conjunction with a solid film lubricant, to the dovetail base of the blade. The protective coating is composed of a soft copper-nickel alloy or a copper-nickelindium alloy, which is applied by plasma spraying. Subsequently, the coating is dry film lubricated using molybdenum disulfide in an organic resin binder. This solid film lubricant initially provides a low coefficient of friction in an attempt to prevent galling, and to delay the onset of adhesive wear originating from metal-to-metal contact. This is described in ASM Handbook, Volume 18, Oct. 1992, pp. 588–592 by Schell, J.D. et al.

Once this solid lubricant has been eroded, the CuNiIn coating on the dovetail base of the blade rubs against the titanium alloy disc groove surfaces damaging the disc by removal of the metal from the disc and by creating pits in the disc. The disc damage may lead to seizure of the blades within the disc grooves or, in extreme cases, to premature fatigue failure of the disc.

Thus, these prior art coatings have not proved fully successful in the prevention of the metal-to-metal wear of surfaces of titanium alloys in frictional contact with one another. Disadvantageously, too, such copper- nickel-indium and copper-nickel alloy systems display a good oxidation resistance up to about 315° C. Usually, jet engines and the like are subjected to a broad temperature gradient in the fan/compressor which ranges from sub-zero (–60° C.) up to approximately 600° C. at the rear compressor stage, substantially above the effective 315° C. upper temperature limit of the copper-nickel and copper-nickelindium alloys.

It is well known in the art to utilize cobalt based alloys for overlay coatings on substrates to reduce oxidation and corrosion at elevated temperatures. In the U.S. Pat. No. 4,034,142 issued Jul. 5, 1977 to R. J. Hecht, there are disclosed overlay coatings for use exclusively in high temperature applications for the protection of substrates against oxidation and hot corrosion. The coatings contain aluminum, chromium, yttrium and silicon and a metal chosen from the group consisting of nickel, cobalt and iron or mixtures thereof. The coatings are particularly suited for the protection of nickel and cobalt superalloys at elevated temperatures, i.e. of the order of 1000° C., by the formation of a stable oxide surface layer of alumina on the coatings which acts as a diffusion barrier to minimize further reactions.

A. R. Nicoll, in U.S. Pat. No. 4,503,122 issued Mar. 5, 1985, provides a high temperature protection layer for temperatures above 600° C. usually substantially above 900° C., for high temperature gas turbine parts manufactured from an austenitic material such as a nickel superalloy. The layer is composed of a base of chromium, aluminum and cobalt with silicon and yttrium. Again, the protective nature of the coatings relies on the formation of a continuous cover of an alumina skin resistant to high temperature corrosion at above 900° C.

W. J. Brindley et al, U.S. Pat. No. 5,116,690 issued May 26, 1992 discloses overlay coatings of MCrAlX in which M may be nickel, cobalt or iron and X may be yttrium, Yb, Zr, or Hf on $Ti_3Al+Nb$ titanium alloys in an oxidizing environment.

The overlay coatings disclosed in the Hecht, Nicoll and Brindley et al patents are used at temperatures in excess of 900° C., well above the temperatures at which titanium alloys are used. The overlay coatings protect the airfoil of a blade against destructive influence of hot gas atmospheres. No protection for wear due to rubbing of an overlay coating against another solid surface is contemplated.

U. S. Pat. No. 4,789,441 issued Dec. 6, 1988 to J. Foster et al and U. S. Pat. No. 4,810,334 issued Mar. 7, 1989 to F. J. Honey et al disclose protection layers on turbine blades comprised of particles of chromium, aluminum, yttrium and silicon in a matrix of cobalt applied by composite electrolytic deposition. The protective layers and anchoring coats of a larger particle size are applied by electrolytic deposition and then spray coated with a thermal barrier of a refractory material by plasma deposition. These patents thus relate to the use of a cobalt alloy to anchor a ceramic coating to a substrate.

Privett III, et al. in U. S. Pat. No. 5,292,596 issued Mar. 8, 1994 provides a method for protecting a force-transmitting or force-receiving surface of titanium from fretting fatigue. The composition of the coating used is essentially, by weight, 30 to 70% cobalt, about 25 to 55% nickel and about 5 to about 25% iron. The essential feature of the patent disclosure is the presence of iron which, when oxidized to hematite at elevated temperatures, in the range of 480° to 650° C. provides the improved anti-fretting properties.

Luthra et al. in U. S. Pat. 5,077,140 issued Dec. 31, 1991 disclose a method for protecting substrates from oxidation at temperatures of up to about 900° C. The coatings consist of a continuous coating of ductile MCrAl or ductile MCr alloys where M is at least one metal selected from the group consisting of iron, nickel and cobalt.

Luthra et al.'s coatings protect titanium substrates against oxidation and not against metal-to-metal wear. According to Luthra et al., the coatings are useful for temperatures above 600° C. when the titanium alloys have a high affinity for oxygen. Luthra et al. coatings do not provide metal-to-metal wear protection and, furthermore, they are intended only for elevated temperatures in a restricted range of 600°–900° C.

Cobalt alloy coatings useful as wear-resistant materials are exemplified in such products as "Stellite"* and "Tribaloy"*. The Stellite type coatings are typically composed of a chromium, tungsten strengthened cobalt matrix containing a high percentage of very hard carbides, predominantly chromium carbides. The Tribaloy type coatings are either cobalt or nickel based with molybdenum, silicon and chromium as the major alloying elements. The Tribaloy compositions are so balanced that the bulk of the structure is in hard, brittle, laves phases having a Rockwell Hardness (HRC) in the 50 to 60 range. Both Stellite and Tribaloy alloys are so hard as to prove unmachinable, and it is this hardness which is responsible for the wear resistant properties of coated articles. Unfortunately, should a softer part, such as one formed from titanium based alloy, be rubbed against by the coating-hardened surface, the latter will cause the softer part to wear excessively.

Cobalt based superalloys have been developed for their high temperature mechanical properties and oxidation resistance. They are typically used as wrought or cast solid parts, not as a coating. Although such alloys will not damage other superalloy surfaces when in contact with them, they cannot be used with titanium alloys without deleterious effects thereto. *Trademarks

SUMMARY OF THE INVENTION

In accordance with the present invention, there are provided protective coatings particularly useful to reduce the coefficient of friction and to enhance wear-resistance of titanium based alloys.

In its simplest aspect, the protective coating comprises a film of substantially pure cobalt which may be applied such as by thermal spraying onto one of the friction engaging titanium alloy surfaces or by interposing a thin film of cobalt material between a pair of friction engaging titanium alloy surfaces whereby the protective cobalt material is transferred onto one or both friction engaging surfaces by rubbing contact.

In a second broad aspect, the protective coating additionally comprises cobalt together with one or more of chromium, aluminum, silicon, yttrium, hexagonal boron nitride or selective mixtures thereof.

More particularly, the present invention comprises a mechanical component of titanium or titanium alloy having a contacting surface for use in an apparatus having an opposed, contacting surface of titanium or titanium alloy, which in operation subjects the surface of said mechanical component to fretting adhesive wear, i.e. metal-to-metal wear, comprising the said surface of said mechanical component having an adherent, protective, lubricous coating comprising cobalt or cobalt and at least one alloying element selected from the group consisting of chromium, aluminum, silicon and yttrium in an amount effective for contact transfer of a portion of the adherent, lubricous, protective coating from the surface of the mechanical component to the opposed, contacting surface of the apparatus whereby the surfaces are protected from fretting wear. Typically, the mechanical component is a Jet engine component of titanium alloy, which in operation has a surface that is subjected to metal-to-metal wear in a temperature range of –60° C. to 600° C., said surface having a said protective, adherent, lubricous coating formed thereon such as by thermal spraying. The protective adherent, lubricous coating may comprise one or more of cobalt, cobalt and about 0.01 to about 35% by weight chromium, cobalt and about 0.01 to about 20% by weight aluminum, cobalt and about 0.01 to about 7% by weight silicon, cobalt and about 0.01 to about 2% by weight yttrium, and additionally hexagonal boron nitride in the range of about 0.01 to about 30% by volume.

A preferred cobalt alloy composition range comprises, by weight, 17–35% chromium, 3–12.5% aluminum, 0.5–7% silicon, 0.3-2% yttrium, the balance cobalt. Another preferred cobalt alloy composition comprises, by weight, 29.2% chromium, 6.1% aluminum, 2% silicon, 0.35% yttrium, the balance cobalt.

A further preferred cobalt alloy composition comprises, by weight, 6–12% aluminum and the balance cobalt. Another preferred cobalt alloy composition comprises, by weight, about 9% aluminum and the balance cobalt.

Another preferred aspect of the invention contemplates the addition of hexagonal boron nitride to each specific coating formulation. It is postulated that there is uniform distribution of the boron nitride throughout the coating which results in improved lubrication.

Advantageously, the coatings disclosed herein prevent destructive frictional contact between the surfaces of titanium alloy components. It is to be emphasized that the coatings are specific to titanium alloys. Furthermore, because of the low coefficient of friction in comparison to that of the uncoated titanium alloys, minimal disturbance of the uncoated titanium alloy surfaces occurs. Thus, the resultant diminution in scratching and pitting of the titanium alloy surface normally due to metal-to-metal wear results in reduced risk of fatigue cracking. Additionally, the inclusion of the alloying elements in certain coatings provides high temperature capability. A marked advantage of the coatings disclosed herein lies in the fact that their protective properties are inherent at ambient temperatures, unlike the prior art overlay coatings which require the application of heat before becoming functional.

It is to be noted also that the coatings exhibit predictable and stable long term wear and frictional behaviour. Also, the coatings are longer lasting than those of the prior art and require less maintenance. Somewhat surprisingly, it has been observed that the coefficient of friction appears to decrease with time as opposed to the prior art coatings, which have an increasing coefficient of friction with time.

In summary, therefore, the invention provides a novel coated mechanical component formed of titanium alloy substrate coated with a cobalt or cobalt alloy based coating which is capable of frictionally engaging a second component which is also formed of titanium based alloy for transfer of the cobalt or cobalt alloy to untreated surfaces of the mechanical components by rubbing contact between the mechanical components whereby the coefficient of friction therebetween is markedly reduced, with concomitant damage to both titanium alloy components being substantially eliminated.

As will be evident to one skilled in the art, the present discovery provides a method of reducing damage to the surfaces of two frictionally engaging alloy surfaces, wherein the alloy is specifically titanium based.

DESCRIPTION OF THE PREFERRED EMBODIMENT

Figure 1:
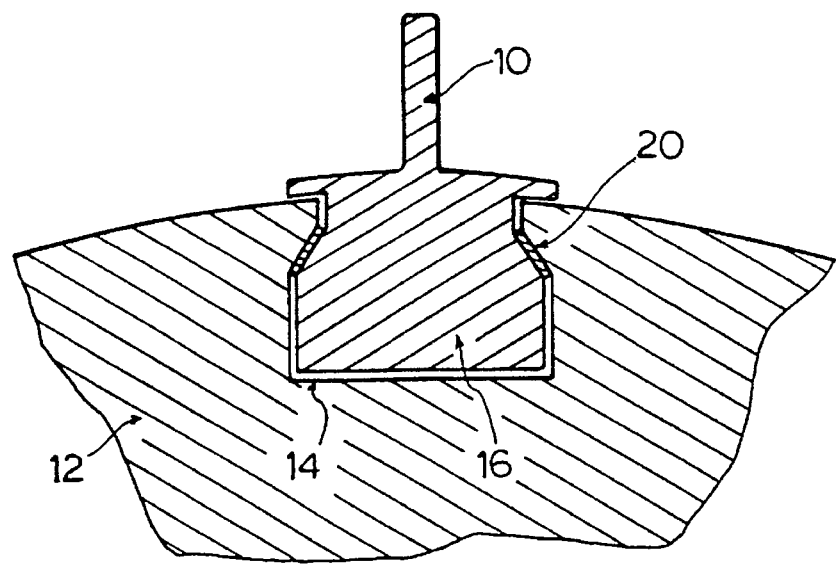
FIG. 1 is a cross-sectional view illustrating the applied coating as utilized in the context of a Jet engine.

Having reference to the accompanying drawings wherein the application of the invention specifically to jet engines is demonstrated, there is shown in FIG. 1 a single compressor blade 10. The compressor disc 12 has a groove 14 formed on the periphery thereof adapted to receive the root or base 16 of blade 10 in a dovetail engagement. The blade root 16 or the inner shoulders of the disc groove 14 are thermally sprayed with coating 20, as illustrated. Whilst the invention is in part described with respect to a Jet engine, it is to be understood that the invention is not to be limited to this application, but can be applied whenever two titanium or titanium alloy components come into frictional engagement with one another. Other techniques such as physical vapour deposition, chemical vapour deposition and the like can be used to deposit the coating.

The experimental data generated and given herebelow were obtained by applying the coating using standard high velocity oxy-fuel spraying equipment. In the spraying process a powder of the alloy to be applied is introduced into a hot supersonic plume formed by burning a combustion gas, for example, propylene, mixed with oxygen. The powder particles are heated and accelerated in the plume. A portion of the heated particles adheres to the titanium alloy to form the continuous protective coating 20. The coating thickness preferably is approximately 127 micrometres but is adjustable by controlling spray parameters, as is well known in the art.

EXAMPLE 1

Cobalt powder having a particle size less than 45 micrometres and comprising essentially cobalt with 0.69% oxygen, was sprayed onto a Ti-6Al-4V sample. The titanium alloy sample had been previously degreased and grit blasted using 40 grit (450 micrometers) alumina at a pressure of 550 kPa using a suction type grit blaster.

The spraying was effected using an air cooled high velocity oxy-fuel (HVOF) unit. The spray conditions were as follows:

| | |
|---|---|
| Oxygen flow | 20,400 liters/hour |
| Propylene flow | 4,200 liters/hour |
| Spray distance | 20.3 cm |
| Powder flow rate | 16 g/min |

The coating was sprayed to a 127 μm thickness which is typical of the actual application. The coatings had the following mechanical properties: the diamond pyramid hardness load 3009 ($DPH_{300}$) was 228 and the ultimate tensile strength (U.T.S.) was 63.4 MPa. The coating oxygen content was 2%.

The testing of the coating was carried out at room temperature in a wear-friction rig simulating the conditions encountered in the frictional contact between a dovetail blade attachment in a Jet engine disc. The coating was rubbed against a Ti-6Al-4V block with the following results:

TABLE 1

| | |
|---|---|
| Initial Coefficient of Friction | 0.46 |
| Final Coefficient of Friction | 0.30 |
| Stability of Coefficient of Friction | slightly variable |
| Ti-6AL-4V block material pick-up | 18 μm |
| Deepest Ti-6Al-4V block pit | 0 μm |
| Coating Wear | 89 μm |

Cobalt alloy powder having a particle size less than 45 micrometers was used. The powder had the composition given below:

| Element | Weight % |
|---|---|
| Cr | 28.9 |
| Al | 5.8 |
| Si | 1.7 |
| Y | 0.35 |
| Co | Balance |

The titanium alloy substrate, its preparation, spray equipment and spray parameters were similar to those given in Example 1 to yield a coating of 127 μm thickness. The coating had the following mechanical properties: the $DPH_{300}$ was 650 and the U.T.S. was 54.1 MPa. The test results are set out herebelow:

TABLE 2

| | |
|---|---|
| Initial Coefficient of Friction | 0.59 |
| Final Coefficient of Friction | 0.36 |
| Stability of Coefficient of Friction | slightly variable |
| Ti-6Al-4V block material pickup | 12 μm |
| Deepest Ti-6Al-4V block pit | 0 μm |
| Coating wear | 58 μm |

EXAMPLE 3

A mechanical mixture of the CoCrAlSiY alloy powder having the composition described in Example 2 had 30 weight % hexagonal boron nitride (BN) of approximately 100 micrometre average particle size added thereto. The titanium alloy preparation, spray equipment and spray parameters were similar to those given in Example 1 to yield a coating of 127 μm thickness. The coating was found to have a $DPH_{300}$ of 330 and a U.T.S. of 39 MPa. The test results are given below:

TABLE 3

| | |
|---|---|
| Initial Coefficient of Friction | 0.49 |
| Final Coefficient of Friction | 0.36 |
| Stability of Coefficient of Friction | stable |
| Ti-6Al-4V block material pick-up | 12 μm |

TABLE 3-continued

| | |
|---|---|
| Ti-6Al-4V block deepest pit | 0 μm |
| Coating wear | 79 μm |

X-ray analysis indicated the presence of hexagonal BN in the coating. Metallographic examination showed a uniform distribution of BN throughout the thickness of the coating. Chemical analysis indicated about 17 volume % of hexagonal BN in the coating.

It was determined that the addition of BN softened the coating compared to the coating without BN (Example 2). BN also caused the initial coefficient of friction to be lowered and in general the coefficient of friction was more stable during rubbing.

EXAMPLE 4

A CuNiIn coating having a comparable chemical composition to that commonly used in the prior art was applied to the same titanium alloy and subjected to identical tests as those conducted on the coatings described above.

The chemical composition of the CuNiIn coating was approximately: 58% Cu, 37% Ni, 5% In. The data for the CoCrAlSiY-BN coating are the same as for Example 3.

TABLE 4

| | CoCrAlSiY—BN Coating | CuNiIn Coating As sprayed |
|---|---|---|
| Initial Coefficient of Friction | 0.49 | 0.3 |
| Final Coefficient of Friction | 0.36 | 0.58 |
| Stability of Coefficient of Friction | stable | unstable, increases with time |
| Ti-6AL-4V block wear or pick-up | 12 μm (pick-up) | 58 μm (wear) |
| Deepest Ti-6Al-4V block pit | 0 μm | 127 μm |
| Coating wear | 79 μm | 86 μm |
| Coating deepest pit | 99 μm | 107 μm |

The superior performance of the CoCrAlSiY-BN coating was demonstrated by:

(i) the observation that the CoCrAlSiY-BN coating material transferred from the coated substrate to the titanium alloy block provided wear protection thereto. The CuNiIn coated item damaged the titanium alloy block extensively by removing a deep layer and pitting of the block material.

Figure 2:
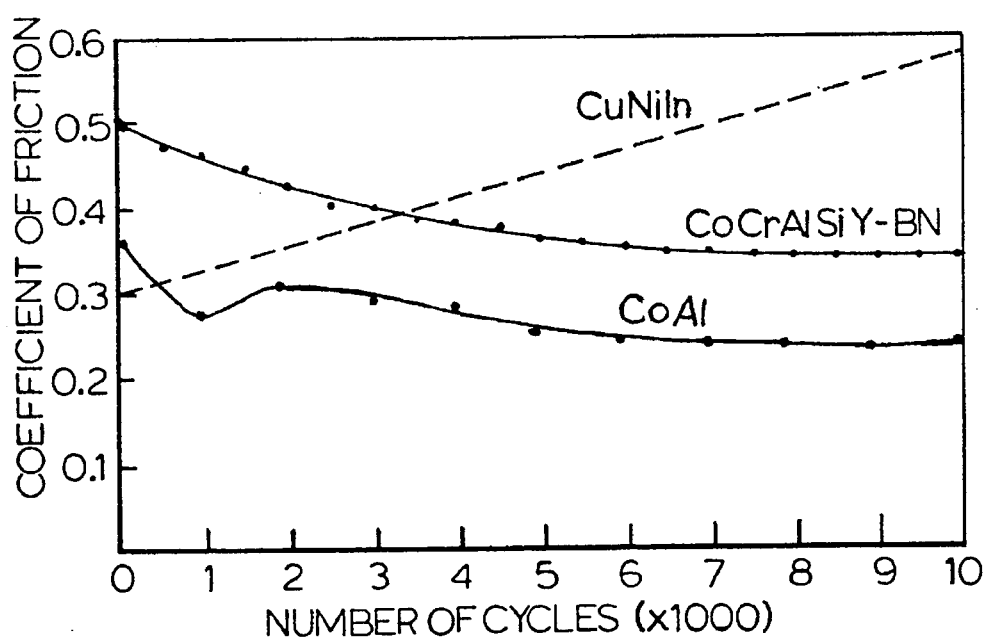
FIG. 2 is a plot showing the decrease of the coefficient of friction versus time for two coating formulations in comparison to that of a prior art coating.

(ii) a lower and stable coefficient of friction, as shown in FIG. 2.

(iii) very reproducible performances in the wear and friction rig as demonstrated with the CoCrAlSiY-BN coatings sprayed with different batches of CoCrAlSiY and BN powders. (iv) the coating wear depth and the maximum pitting depth were 92% and 93% of the CuNiIn coating, compared to and 67% respectively of the depth of CoCrAlSiY without BN addition relative to CuNiIn.

EXAMPLE 5

Comparative tests were conducted on the test coatings shown in Table 5 below according to the method described in Example 1 above at temperatures of 24° C. and 454° C. Test results are shown in Tables 5 and 6.

TABLE 5

| Test Coating | Coefficient of Friction Initial | Coefficient of Friction Final | Ti/6Al/4V Block Wear(−), or Pickup(+) μm | Ti/6Al/4V Block Deepest Pit μm | Shoe Coating Wear μm | Shoe Coating Deepest Pit μm |
|---|---|---|---|---|---|---|
| *Sliding Wear Test at 454° C.* | | | | | | |
| CoCrAlYSi/BN | 0.59 | 0.42 | +10 | 0 | −8 | 15 |
| CoCrAlYSi/BN | 0.50 | 0.35 | +8 | 33 | −81 | 145 |
| NiCrMoNbFe/BN | 0.49 | 0.48 | −140 | 200 | −30 | 50 |
| NiCr/BN | 0.53 | 0.61 | −33 | 66 | −10 | 23 |
| TiAl/BN | 0.51 | 0.61 | −195 | 310 | −246 | 361 |
| *Sliding Wear Test at 24° C.* | | | | | | |
| Co/CoO | 0.46 | 0.30 | +18 | 0 | −89 | 114 |
| CoCrAlYSi | 0.59 | 0.36 | +12 | 0 | −58 | 72 |
| CoCrAlYSi/BN | 0.49 | 0.36 | +12 | 0 | −79 | 99 |
| CuNiIn | 0.30 | 0.58 | −58 | 127 | −86 | 107 |
| CoCrAlNiY | 0.56 | 0.48 | 0 | 10 | −68 | 122 |
| CoCrNiWSiC* (1) | 0.47 | 0.67 | −56 | 91 | −91 | 157 |
| CoCrMoSi (2) | 0.77 | 0.55 | −218 | 315 | −56 | 86 |

TABLE 5-continued

|  | | | Ti/6Al/4V Block | | Shoe Coating | |
|---|---|---|---|---|---|---|
| Test | Coefficient of Friction | | Wear(−), or Pickup(+) | Deepest Pit | Wear | Deepest Pit |
| Coating | Initial | Final | μm | μm | μm | μm |
| CoAl | 0.40 | 0.27 | +5 | 2 | −63 | 81 |
| CoCr | 0.62 | 0.37 | +13 | 0 | −68 | 89 |
| CoO | 0.64 | 0.66 | −86 | 114 | −152 | 218 |

*Test stopped prematurely due to seizure of rubbing surfaces
(1) STELLITE ™ Composition
(2) TRIBALOY ™ Composition

TABLE 6

| Test | Composition, wt % | | U.T.S | Microhardness |
|---|---|---|---|---|
| Coating | Coating Alloy | BN | MPa | DPH$_{300}$ |
| Sliding Wear Test at 454° C. | | | | |
| CoCrAlYSi/BN | 63.2 Co, 28.9 Cr, 5.8 Al, 0.4 Y, 1.7 Si | 15 | na | na |
| CoCrAlYSi/BN | 63.2 Co, 28.9 Cr, 5.8 Al, 0.4 Y, 1.7 Si | 30 | 38–41 | 335 |
| NiCrMoNbFe/BN | 63.7 Ni, 21.6 Cr, 9 Mo, 3.7 Nb, 2 Fe | 15 | na | na |
| NiCr/BN | 80 Ni, 20 Cr | 9 | na | na |
| TiAl/BN | 100 TiAl | 20 | na | na |
| Sliding Wear Test at 24° C. | | | | |
| Co/CoO | 98 Co, 2 O$_2$ | 0 | 63.4 | 228 |
| CoCrAlYSi | 63.2 Co, 28.9 Cr, 5.8 Al, 0.4 Y 1.7 Si | 0 | 54.1 | 650 |
| CoCrAlYSi/BN | 63.2 Co, 28.9 Cr, 5.8 Al, 0.4 Y, 1.7 Si | 30 | 39.0 | 330 |
| CuNiIn | 58 Cu, 37 Ni, 5 In | 0 | na | na |
| CoCrAlNiY | 58.7 Co, 23.9 Cr, 7.1 Al, 9.8 Ni, 0.5 Y | 0 | 61.6 | na |
| CoCrNiWSiC* | 52.9 Co, 27 Cr, 11 Ni, 8 W, 0.6 Si, 0.5 C | 0 | 58.5 | na |
| CoCrMoSi | 50.6 Co, 17.5 Cr, 28.5 Mo, 3.4 Si | 0 | 51.6 | na |
| CoAl | 91 Co, 9 Al | 0 | 61.5 | na |
| CoCr | 80 Co, 20 Cr | 0 | 63.4 | na |
| CoO | 100 CoO | 0 | 53.9 | na |

The 24° C. Sliding Wear Test data obtained by rubbing a shoe of Ti-6Al-4V having protective coatings of a thickness of about 127 micrometers thereon against an uncoated block of Ti-6Al-4V show clearly that cobalt metal and cobalt alloys of the invention containing Cr, Al, and Y all function similarly in that coating material was transferred to the uncoated Ti-6Al-4V block and pitting damage to the uncoated block was virtually eliminated under the test conditions.

Protective coatings comprised of CoCrAlYSi/BN produced 10 micron and 8 micron transfers (pick-up) of the coating to the uncoated surface and yielded significant coefficient of friction reductions of 0,017 to 0,015, i.e. from 0.59 to 0.42 and from 0.50 to 0.35, at 454° C.

The three high temperature tests on non-cobalt alloys (nickel and titanium alloys) containing BN had essentially unchanged or increased coefficients of friction, and up to 195 micron losses of titanium alloy surface materials with up to 310 micron deep pits in the uncoated surfaces were observed.

Protective coatings comprised of Co/CoO (2% by weight oxygen largely resulting from oxidation during the spray coating process), CoCrAlYSi, CoCrAlYSi/BN, CoAl and CoCr produced 5 micron to 18 micron transfers of the coatings to the uncoated surfaces and yielded low final coefficients of friction in the range of 0.27 to 0.37, at 24° C.

The addition of Ni, W, Si, C, or Mo to the cobalt-chrome alloy base clearly had a deleterious, and in one case, disastrous effect on the behaviour of the coating. The effect of nickel itself as a substitute for Si was definitely negative (see the results for the CoCrAlNiY alloy). The negative results on TRIBALOY™ (CoCrMoSi) and STELLITE™ (CoCrNiWSiC) coatings are significant, particularly the severe wear of 218 micron loss of uncoated surface and 315 micron deep pitting of the uncoated surface by the TRIBALOY coating. These tests confirm the importance of selecting the right alloying elements to add to the Co base alloy.

EXAMPLE 6

Cobalt alloy powder as described in Example 2 was mixed with a graphite powder having a particle size in the −74 μm +44 μm range. The two powders were mixed in a 1:1 weight ratio before spraying.

The titanium alloy substrate, its preparation, spray equipment and spray parameters were similar to those given in Example 1 to yield a coating of 127 μm thickness. The coating had the following mechanical properties: the DPH$_{300}$ was 290 and the U.T.S. was 31.6 MPa.

The test results are shown in Table 7 below.

TABLE 7

| Initial Coefficient of Friction | 0.56 |
|---|---|
| Final Coefficient of Friction | 0.73 |
| Stability of Coefficient of Friction | very unstable |
| Ti-6Al-4V block material wear | 27.9 μm |

TABLE 7-continued

| Deepest Ti-6Al-4V Block Pit | 48.3 μm |
|---|---|
| Coating Wear | 239 μm |

The presence of graphite in the coating was confirmed by X-Ray diffraction. A chemical analysis indicated approximately 13 vol % of graphite in the structure. The coefficient of friction was very unstable and increased during the test. No coating pick-up was observed and block material wear and pitting were significant.

EXAMPLE 7

Co-9 Al alloy powder was gas atomized and screened to a size range of −44 μm. The titanium alloy substrate, its preparation, spray equipment and spray parameters were similar to those given in Example 1 to yield a coating of 127 μm thickness. The coating had U. T. S. of 67.0 MPa. The test results are set out herebelow:

TABLE 8

| Initial Coefficient of Friction: | 0.37 |
|---|---|
| Final Coefficient of Friction: | 0.26 |
| Stability of Coefficient of Friction: | Very stable |
| Ti-6Al-4V Block Material Pick-up: | 9 μm |
| Deepest Ti-6Al-4V Block Pit: | 0 μm |
| Coating Wear: | 51 μm |

FIG. 2 illustrates the low and stable coefficient of friction obtained from the CoAl coating compared to the CuNiIn coating. The coefficient of friction significantly descreased during the test from 0.37 to 0.26. Block material pick-up and no pitting were observed.

The present invention provides a number of important advantages. A protective coating for reducing the coefficient of friction and for enhancing wear resistance of titanium based alloys, said protective coating comprised of cobalt or cobalt based alloys containing at least one of chromium, aluminum, silicon, yttrium or hexagonal boron nitride, can be applied to either one of a pair of opposed, friction engaging surfaces by rubbing contact of a film of the cobalt or cobalt based alloy interposed between the opposed surfaces. Preferably, one of a pair of opposed surfaces in rubbing engagement is adherently coated with a protective film such as by thermal spraying and the coating film interposed between the opposed surfaces is transferred onto the opposed unprotected surface by rubbing contact. Alternatively, a thin film of the protective cobalt based material can be placed between the opposed, friction engaging surfaces for transfer of a coating onto both of the said opposed surfaces by rubbing contact.

It will be understood that changes and modifications may be made in the embodiments of the invention without departing from the scope and purview of the appended claims.

We claim:

1. A mechanical component of titanium or titanium alloy having a contacting surface for use in an apparatus having an opposed, contacting surface of titanium or titanium alloy which in operation subjects the surface of said mechanical component and the opposed contacting surface of the apparatus to metal-to-metal wear comprising: the surface of said mechanical component or the opposed contacting surface of the apparatus having a lubricous, protective coating consisting essentially of cobalt and at least one alloying element selected from the group consisting, by weight, of about 17 to about 35% chromium, about 3 to about 12.5% aluminum, about 0.5 to about 5% silicon and about 0.3 to about 2% yttrium for contact transfer of a portion of the lubricous, protective coating from the coated surface to the opposed, contacting surface whereby the surfaces are protected from metal-to-metal wear.

2. A mechanical component as claimed in claim 1 in which said surface of the mechanical component has an adherent, lubricous, protective coating consisting essentially of cobalt and about 27 to about 32% by weight chromium.

3. A mechanical component as claimed in claim 2 in which said surface of the mechanical component has an adherent, lubricous, protective coating including about 4 to about 8% by weight aluminum.

4. A mechanical component as claimed in claim 3, in which said surface of the mechanical component has an adherent, lubricous, protective coating including about 1 to about 3% by weight silicone.

5. A mechanical component as claimed in claim 4, in which said surface of the mechanical component has an adherent, lubricous, protective coating including about 0.35 to about 1% by weight yttrium.

6. A mechanical component as claimed in claim 5, in which said surface of the mechanical component has an adherent, lubricous, protective coating including about 10 to about 30% by volume hexagonal boron nitride uniformly distributed throughout the coating.

7. A mechanical component as claimed in claim 2, in which said surface of the mechanical component has an adherent, lubricous, protective coating including about 10 to about 30% by volume hexagonal boron nitride uniformly distributed throughout the coating.

8. A mechanical component as claimed in claim 1 in which said surface of the mechanical component has an adherent, lubricous, protective coating consisting of cobalt and about 4 to about 8% by weight aluminum.

9. A mechanical component as claimed in claim 1 in which said surface of the mechanical component has an adherent, lubricous, protective coating including hexagonal boron nitride in the range of about 10 to about 30% by volume uniformly distributed throughout the coating.

10. A mechanical component as claimed in claim 1, in which said surface has an adherent, lubricous, protective coating consisting of comprising about 6 to about 12% by weight aluminum, the balance cobalt.

11. A mechanical component as claimed in claim 1, in which said surface has an adherent, lubricous, protective coating consisting of about 9% by weight aluminum, the balance cobalt.

12. A mechanical component as claimed in claim 11 in which the protective coating additionally contains about 17% by volume hexagonal boron nitride uniformly distributed throughout the coating.

13. A mechanical component as claimed in claim 1 in which said surface has an adherent, lubricous, protective coating consisting of about 17 to about 32% by weight chromium, the balance cobalt.

14. A mechanical component as claimed in claim 1 in which said surface has an adherent, lubricous, protective coating consisting of about 29% by weight chromium, the balance cobalt.

15. A mechanical component as claimed in claim 1, in which the coating consists of, by weight, 29.2% chromium, 6.1% aluminum, 2% silicon, and 0.35% yttrium, the balance cobalt.

16. A mechanical component as claimed in claim 15, in which the coating additionally contains, by volume, 17% hexagonal boron nitride uniformly distributed throughout the coating.

17. A mechanical component as in claim 1 in which said surface has an adherent, lubricous, protective coating consisting of 17 to about 32% by weight chromium, 5 to about 12% by weight aluminum, the balance cobalt.

18. A gas turbine component of titanium alloy, which in operation at a temperature in the range of −60° to 600° C. has a first surface which is subjected to metal-to-metal wear against an opposed, contacting second surface of titanium alloy, said first surface having an adherent lubricous, protective coating consisting essentially of cobalt and at least one alloying element selected from the group consisting, by weight, of about 17 to about 35% chromium, about 3 to about 12.5% aluminum, about 0.5 to about 5% silicon and about 0.3 to about 2% yttrium for contact transfer of a portion of the lubricous, protective coating from the first surface to the opposed, contacting surface whereby the surfaces are protected from metal-to-metal wear.

19. A gas turbine engine component as claimed in claim 18, in which the protective coating consists essentially of, by weight, 29.2 chromium, 6.1% aluminum, 2% silicon and 0.35% yttrium, the balance cobalt.

20. A gas turbine engine component as claimed in claim 14 in which the said component is a compressor or fan blade having a dovetail base fitted into a mating groove of a compressor or fan disc having opposed contacting surfaces and in which the protective coating is applied to the dovetail base of the blade for contact transfer of a portion of the protective coating onto the opposed contacting surfaces of the mating groove of the gas turbine compressor or fan disc.

21. A gas turbine engine component as claimed in claim 20, said protective coating including about 10 to about 30% by volume hexagonal boron nitride uniformly distributed throughout the coating.

22. A gas turbine engine component as claimed in claim 20 in which the protective coating additionally contains about 17% by volume hexagonal boron nitride uniformly distributed throughout the coating.

23. A gas turbine engine component as claimed in claim 19, in which the coating includes, by volume, about 10 to about 30% hexagonal boron nitride uniformly distributed throughout the coating.

24. A gas turbine engine component as claimed in claim 23 in which the protective coating additionally contains about 17% by volume hexagonal boron nitride uniformly distributed throughout the coating.

25. A gas turbine engine compnent as claimed in claim 18 in which the said component is a compressor or fan blade having a dovetail base fitted into a mating groove of a compressor or fan disc having opposed contacting surfaces and in which the protective coating consists of about 6 to about 12% by weight aluminum, the balance cobalt and is applied to the dovetail base for contact transfer of a portion of the protecting coating onto the opposed contacting surfaces of the mating groove of the compressor or fan disc.

26. A gas turbine engine component as claimed in claim 18 in which the said component is a compressor or fan blade having a dovetail base fitted into a mating groove of a compressor or fan disc having opposed contacting surfaces and in which the protective coating consists of about 17 to about 32 by weight chromium, the balance cobalt and is applied to the dovetail base for contact transfer of a portion of the protecting coating onto the opposed contacting surfaces of the mating groove of the compressor or fan disc.

27. A gas turbine component as claimed in claim 18 in which the protective coating consists of about 6 to about 12% by weight aluminum, the balance cobalt.

28. A gas turbine component as claimed in claim 18 in which the protective coating consists of about 9% by weight aluminum, the balance cobalt.

29. A gas turbine component as claimed in claim 18 in which the protective coating consists of about 17 to about 32% by weight chromium, the balance cobalt.

30. A gas turbine component as claimed in claim 18 in which the protective coating consists of about 29% by weight chromium, the balance cobalt.

* * * * *